United States Patent [19]

Soderberg

[11] Patent Number: 4,894,901
[45] Date of Patent: Jan. 23, 1990

[54] METHOD FOR POSITIONING A ROBOTIC WORK SYSTEM

[75] Inventor: Mark S. Soderberg, Issaquah, Wash.
[73] Assignee: The Boeing Company, Seattle, Wash.
[21] Appl. No.: 229,287
[22] Filed: Aug. 8, 1988

Related U.S. Application Data

[62] Division of Ser. No. 944,659, Dec. 22, 1986, Pat. No. 4,785,528.

[51] Int. Cl.⁴ .............................................. B23P 21/00
[52] U.S. Cl. ........................................ 29/428; 29/432; 29/469
[58] Field of Search ................. 29/701, 428, 432, 469; 901/8, 15; 414/729, 744.8

[56] References Cited

U.S. PATENT DOCUMENTS

| | | | |
|---|---|---|---|
| Re. 32,794 | 12/1988 | Engelberger et al. | 901/8 X |
| 3,890,552 | 6/1975 | Devol et al. | 901/8 X |
| 4,252,360 | 2/1981 | Gallaher, Jr. | 901/8 X |
| 4,260,319 | 4/1981 | Motoda et al. | 414/749 X |
| 4,541,770 | 9/1985 | Niinomi et al. | 901/8 X |

FOREIGN PATENT DOCUMENTS 137901 10/1979 German Democratic Rep. .... 901/8

Primary Examiner—Mark Rosenbaum
Assistant Examiner—Frances Chin
Attorney, Agent, or Firm—Dellett, Smith-Hill & Bedell

[57] ABSTRACT

A robotic work positioning system includes a programmed, powered robot, and a non-powered arm which is locatable at various positions in three dimensional space by means of the powered robot. A mating interconnection is provided on the non-powered arm whereby the non-powered arm may be accurately engaged and positioned by the powered robot for holding a part or workpiece at an accurately predetermined location. Together with the powered robot, the non-powered arm facilitates the accurate assembly of component parts. One or more non-powered arms can be used to generate three dimensional tooling which can be altered robotically.

5 Claims, 4 Drawing Sheets

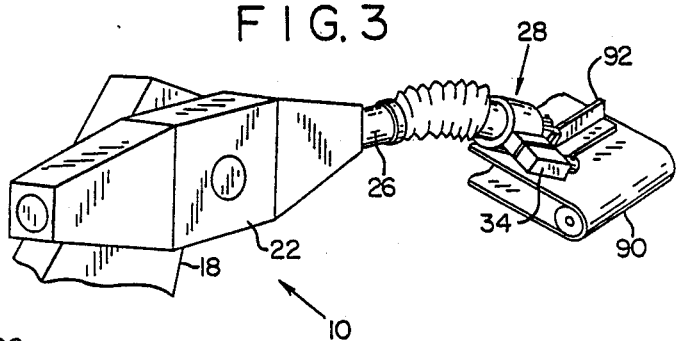
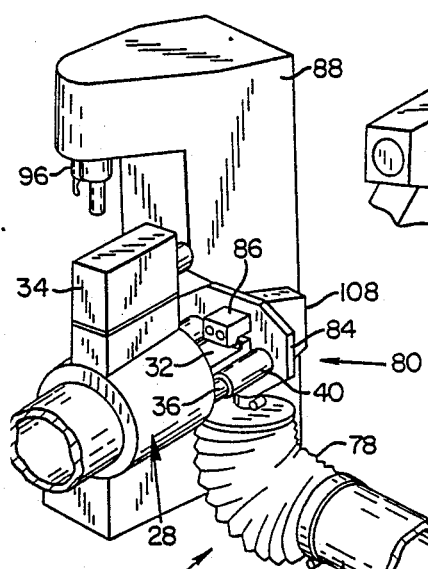
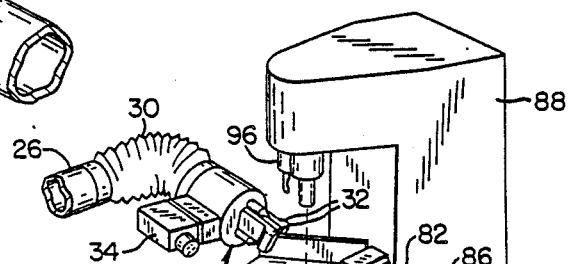
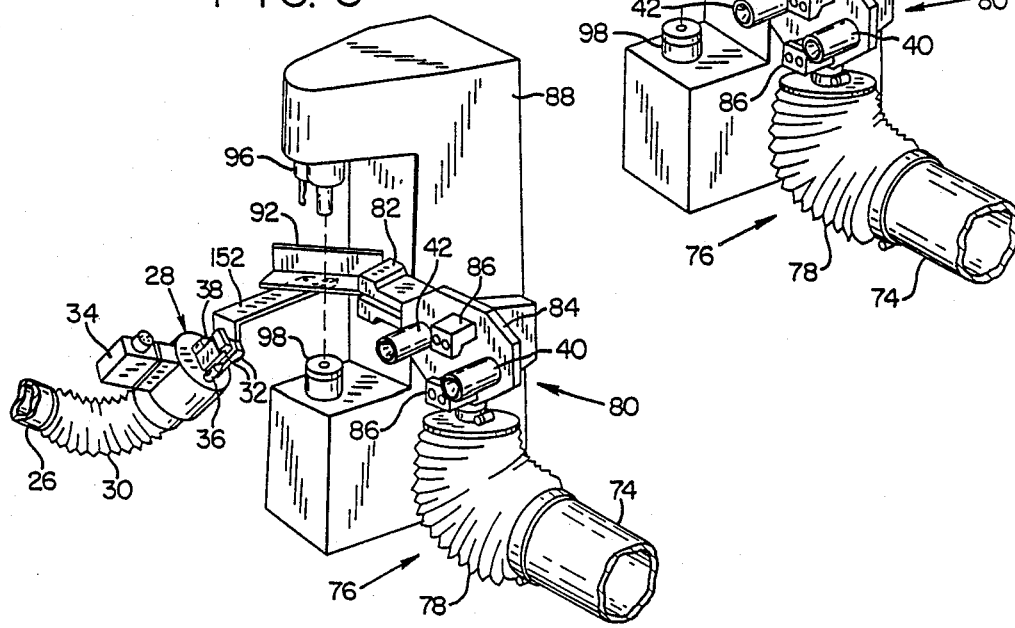

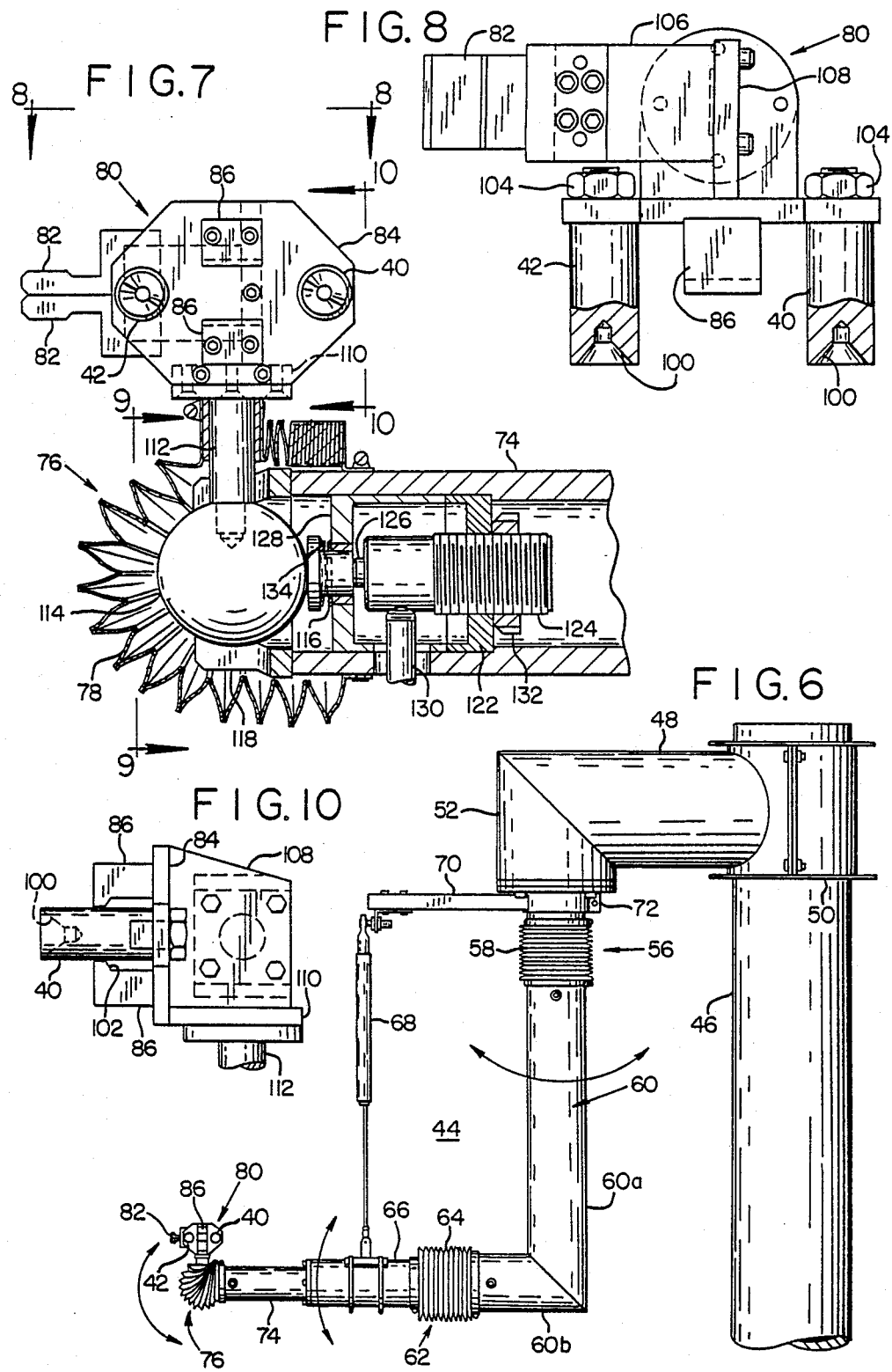

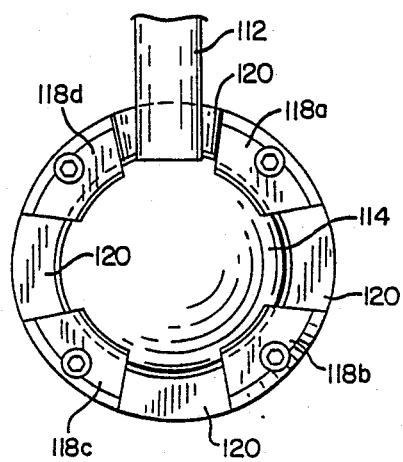
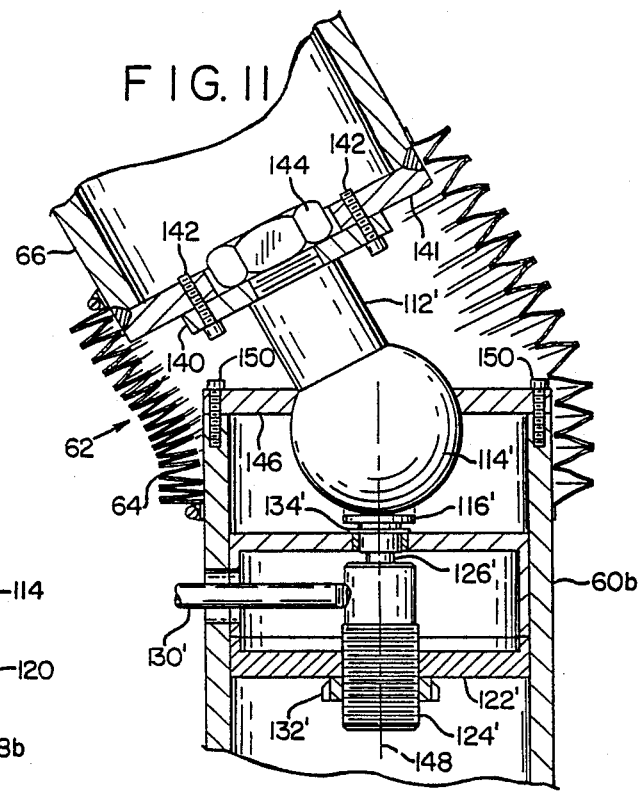
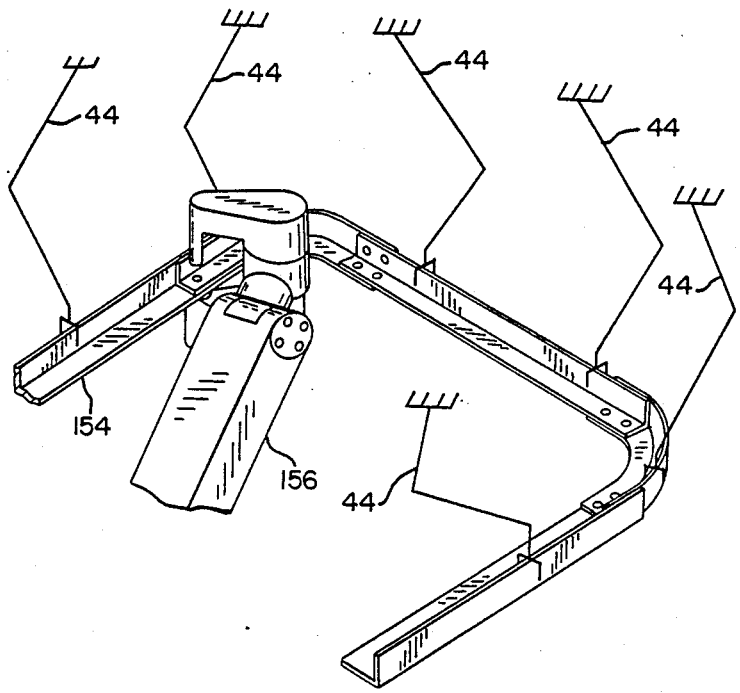

METHOD FOR POSITIONING A ROBOTIC WORK SYSTEM

This is a divisional of co-pending application Ser. No. 944,659 filed on Dec. 22, 1986, now U.S. Pat. No. 4,785,528.

This invention relates to a robotic work positioning system for accurately assembling component parts without requiring extensive tooling.

BACKGROUND OF THE INVENTION

Accurate assembly on a production line basis usually involves tooling to insure parts to be joined are accurately positioned relative to one another. For example, component parts may be located in a fixture for preliminary fastening thereby establishing correct alignment, after which the assembly can be manually or automatically secured at other locations. The tooling employed for the proper simultaneous positioning of workpieces is not readily adapted to different jobs. Thus, when a second combination of parts is to be assembled, new fixtures are ordinarily needed.

Since many industrial operations can be accomplished with robotics it might be supposed that simultaneous positioning of parts without the usual fixturing could be accomplished with a plurality of robots, e.g., one to position each component part. While proposals have been advanced for the joint use of robotic arms (for example, see Devol et al, U.S. Pat. No. 3,890,552, and Gallaher, Jr., U.S. Pat. No. 4,252,360), coordinated motion of plural robots is not well developed, especially where accurate movement is required with respect to a third device or machine tool. Problems arise because of programming complexity, inaccurate relative positioning to desired tolerance levels, and collision detection and avoidance. Therefore, accurate part assembly by this method has not proved practical for the present state of development of the robotics art. Furthermore, an important consideration simply relates to the expense of proliferating programmed robots.

SUMMARY OF THE INVENTION

In accordance with a particular embodiment of the present invention, a handling and assembly system for positioning and attaching mechanical components comprises a powered robot arm and an articulated, non-powered robot arm having a plurality of joints characterized by locked and unlocked conditions. Each of the arms includes a work engaging means. A programmably actuated connection is further provided whereby the non-powered arm can be physically manipulated by the robot. The powered robot arm is programmed for accurate positioning of the non-powered arm at a specific location in three dimensional space, at which location the non-powered arm can be used to hold a first of the parts being assembled. The non-powered arm may be viewed as a programmably positionable fixture for locating a part relative to a machine tool or the like.

The same robot utilized in positioning the non-powered arm can then be used to position a second part in accurately predetermined relation to the first, facilitating accurate fastening by a third device or machine tool. The substantially exact relationship between two parts can be easily programmed inasmuch as the powered robot arm "knows" exactly where it placed the non-powered arm.

The non-powered arm, viewed as a selectively positionable fixture, has an advantage over conventional fixturing inasmuch as its location is completely programmable and therefore the same system can be employed without mechanical change for any number of different jobs, for assembling parts of different shapes, sizes, etc.

Plural non-powered arms of the type described may also be utilized as a fixture for holding parts that are to be fastened in an accurately predetermined relationship in three dimensions, with the individual arms being accurately positionable via a single powered robot. The three dimensional tooling thus established can be altered at any time, eliminating the expense of permanent tooling.

It is accordingly an object of the present invention to provide an improved robotic work positioning system for accurately locating plural workpieces with respect to a third device.

It is a further object of the present invention to provide improved three-dimensional tooling which can be altered robotically.

BRIEF DESCRIPTION OF THE DRAWINGS

For better understanding of the invention, and to show how the same may be carried into effect, reference will now be made, by way of example, to, the accompanying drawings in which:

FIG. 2 is a perspective view of a portion of the FIG. 1 system, illustrating a non-powered robot arm positioned in place by a powered robot arm under a drill-riveter, FIG. 3 illustrates a powered robotic arm obtaining a part from an input conveyor, FIG. 4 illustrates the powered robotic arm handing a part to the non-powered arm, FIG. 5 illustrates a powered robotic arm holding a second part next to the first under the drill-riveter for attachment of parts, FIG. 6 is a side elevational view of the non-powered robot arm according to the present invention, FIG. 7 is a vertical cross section of a first type of joint as employed in the aforementioned non-powered arm, FIG. 8 is a view taken at 8—8 in FIG. 7, FIG. 9 is a view taken at 9—9 in FIG. 7, FIG. 10 is a view taken at 10—10 in FIG. 7, FIG. 11 is a vertical cross section of a second type of joint as employed in the aforementioned non-powered arm, and FIG. 12 is a perspective view of robot generated tooling according to the present invention.

DETAILED DESCRIPTION

Figure 1:
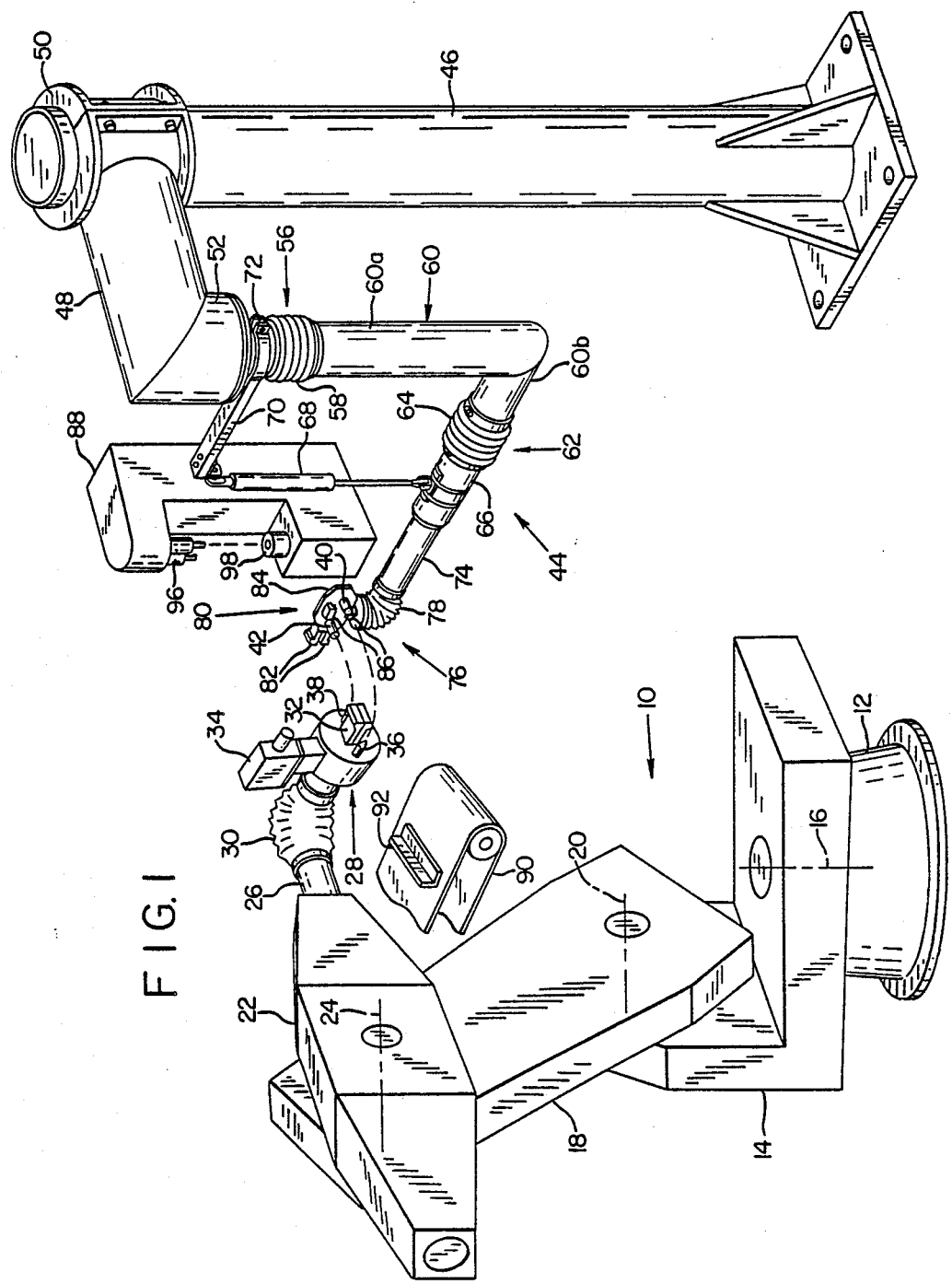
FIG. 1 is a perspective view of a work handling and assembly system according to the present invention in a work cell which further includes a drilling and riveting machine for fastening together a pair of parts.

Referring to the drawings and particularly FIGS. 1 through 5, showing the handling and assembly system according to the present invention in a sequence of operative positions (hereinafter more fully explained), a first powered robot, indicated generally at 10, comprises a base 12 pivotally supporting an L-shaped lower body portion 14 rotatable about an axis identified at 16. Upper body portion 18 turns with respect to horizontal axis 20 and carries upper arm 22 at a joint identified at 24. Upper arm extension 26, which is rotatable with respect to the axis of the arm, supports work engaging member 28 via flexible joint 30. Member 28 is provided with an end effector in the form of gripper fingers 32 controllably movable in a conventional manner toward one another to grasp a part or workpiece. Also mounted on member 28 is a video camera 34 with which the robot can "view" the work. The robot as thus far described is conventional and may be of the general type manufactured by Automatix, Inc., Farmington Hills, Mass.

Further provided upon member 28 is a pair of guide pins 36 and 38, one on either side of gripper fingers 32, utilized to guide placement of member 28 in connecting relation with mating sockets 40 and 42 of the non-powered robot arm generally identified at 44 in FIG. 1.

Non-powered robot arm 44 (additionally depicted in FIG. 6) suitably includes a base or standard 46 having a horizontally disposed shoulder 48 attached to the upper extremity of the standard by means of clamping cylinder 50. Downwardly extending section 52 at the outward end of shoulder 48 terminates in a first flexible joint 56, ordinarily covered with bellows 58 for protection of the moving parts. Supported from joint 56 is an upper arm portion 60 having a substantially vertical section 60a joined to a substantially horizontal lower section 60b ending in a horizontal joint 62 covered with bellows 64. A second and lower arm portion 66 proceeds generally horizontally from joint 64 and is partially supported via air cylinder 68 interposed between arm portion 66 and a bracket 70 positioned in generally parallel relation to arm portion 66 by means of clamp 72 immediately above joint 56. Air cylinder 68, which functions as a counterbalance, is provided with an air supply (by means not shown) producing an upward force on the horizontal arm portion for substantially balancing the weight thereof.

A horizontally aligned extension 74 of arm portion 66 terminates in joint 76 covered by bellows 78 from which a work engaging member 80 is supported. The work engaging member 80 includes fingers 82 remotely actuated in a conventional manner toward one another to grasp a workpiece therebetween. The work engaging member 80 is further provided with a mating connection for interlocking with the work engaging member 28 of robot 10, such mating connection including plate 84 upon which the aforementioned sockets 40 and 42 are mounted, and blocks 86 having an inner configuration, where they face one another, for lockably receiving fingers 32 of robot 10 as the fingers 32 are spread apart. The mechanical configuration matches so that when the fingers 32 are properly positioned in between blocks 86 and moved apart, the forward ends of fingers 32 abut the plate 84 in an accurately predetermined position whereby robot member 28 is capable of accurately positioning work engaging member 80 of non-powered arm 44. As will hereinafter be more fully described, joints 56, 62 and 76 have locked and unlocked conditions and member 80 is movable in conjunction with member 28 only when the aforementioned joints are unlocked. When the robot 10 has positioned the work engaging member 80 at a desired location, the joints 56, 62 and 76 are locked whereby member 28 can be disengaged from member 80, leaving member 80, and particularly gripper fingers 82 thereof, at the desired location.

Sharing a common work cell with powered robot 10 and non-powered robot arm 44 is a further device 88, schematically illustrated in the drawings. Device 88 may comprise means for drilling, riveting, sealing, fastening, or welding a pair of parts or workpieces to one another, as the parts or workpieces are held respectively by robot 10 and non-powered arm 44. In the described embodiment, the device 88 may be considered as comprising a drilling and riveting head 96, and an anvil 98, movable toward and away from one another. Device 88 can, for example, comprise a Drivmatic drilling and riveting machine. Further included in cooperative relation to the same work cell is a conveyor 90 carrying parts to be joined. In the drawing, a part 92 is supported on the conveyor. In a typical installation, incoming, non-connected parts are supplied on one or more conveyors 90, and the properly attached parts, forming an assembly, are delivered to a similar outgoing conveyor.

Features of member 80 and joint 76 of the non-powered arm will be more fully described in connection with FIGS. 7 through 10. Sockets 40 and 42 mounted on plate 84 have tapered end openings 100 for guiding and receiving the matingly tapered ends of pins 36 and 38 on member 28 of robot 10. It will be observed (e.g., in FIG. 10) that blocks 86 are inwardly canted at 102 to receive matingly shaped fingers of robot 10 therebetween, while the space between surface 102 and plate 84 is adapted to closely receive the ends of the robot fingers in predetermined clamping relation when the robot fingers are spread apart between blocks 86. The robot fingers (32 in FIG. 1) suitably have the same cross sectional shape as fingers 82 of the non-powered arm (depicted in FIG. 7). Sockets 40 and 42 accurately locate the powered and non-powered arms in the transverse direction, when they are engaged. Sockets 40 and 42 are secured to plate 84 by means of nuts 104. Pins 36 and 38 fully seat in the tapered portions 100 with fingers 32 locked between blocks 86.

Actuating means 106 for fingers 82 of the non-powered arm is conventional and mounted on a plate 108 attached in perpendicular relation to plate 84 conjointly with supporting structure 110 attached to the outward end of stem 112 forming part of the joint 76. Actuating means 106 is actuated from the program running robot 10.

Joint 76 at the end of arm extension 74 comprises a ball 114 to which the aforementioned stem 112 is joined, ball 114 being captured between plunger 116 and cap 118 connected to the outer end of the hollow cylindrical arm extension 74. As can be seen in FIG. 9, cap 118 is segmented into arcuate portions 118a, 188b, 118c and 118d between which slots are defined which allow stem 112 to swing approximately 180° in the vertical and horizontal directions. The extent of rotation is somewhat more limited to approximately 60° in diagonal directions in between slots 120.

The end of arm extension 74 is counter bored to receive cup shaped plate 122 having a central threaded aperture through which an Enerpac work holding cylinder 124 extends. Cylinder 124 is locked in place by nut 132. Cylinder 124 includes a plurality of stacked Belleville springs which cause cylinder 124's end plunger 126 to bear against the stem of the aforementioned plunger 116 as received in a central bore of cap member 128. When hydraulic pressure is applied via fitting 130 to cylinder 124, plunger 126 is retracted.

Spring washers 134 are received between the head of plunger 116 and cap member 128 for controlling the "preload" for the movable condition for joint 76. Enough pressure is supplied by these springs to prevent play of ball 114, but whereby ball 114 and stem 112 can rotate easily but predictably about a point of rotation defined within cap 118. In assembling the joint structure, cylinder 124 is turned within plate 122 (without application of hydraulic pressure via fitting 130) until predetermined "locking" force is applied to ball 114 through plungers 126 and 116. In a typical embodiment, the screw threaded cylinder was turned until 1000 pounds of preload force was exerted against ball 114, thereby effectively locking the joint. Then, when the force of hydraulic fluid is applied to cylinder 124, the spring pressure on plunger 126 is relieved and the joint can rotate.

A similar joint is illustrated in FIG. 11, and corresponds to the joints 56 and 62 in FIG. 1. Joints 56 and 62 are substantially identical, and for convenience only joint 62 will be described. Moreover, parts corresponding to components herein before described with reference to FIGS. 7-10 are referenced with primed numerals. The joint operates in substantially the same fashion as set forth in regard to joint 76, except the stem 112' is secured to a plate 140 which is in turn attached by cap screws 142 to an end plate 141 of arm portion 66. The outer end of stem 112' is provided with a threaded portion extending through an aperture in plate 140 where it is engaged by holding nut 144 partially received in an aperture in the end plate 141. Ball 114' is captured under ring 146 allowing movement of stem 112' throughout an approximately 60° cone coaxial with the center line 148 of arm portion 60b. Ring 146 is secured to the end of arm portion 60b by means of cap screws 150. In accordance with a preferred embodiment of the present invention, the same hydraulic line is coupled to fittings 130 and 130' as well as the corresponding fitting associated with joint 56 so that the joints of the non-powered arm 44 are either in a locked condition or an unlocked condition. The condition can, of course, be manually controlled, but is preferably controlled by the program operating robot 10.

Considering operation of a preferred embodiment of the invention, with particular reference to FIGS. 1-5, the powered robot is programmed first to move its work engaging member 28 to the position of the work engaging member 80 of non-powered arm 44. Generally speaking, the robot will have theretofore placed the member 80 at a known location in space and will be able to accurately return to such location. The pins 36 and 38 are moved into mating relationship with sockets 40 and 42 and the gripper fingers 32 of the robot are moved apart for engaging the insides of blocks 86 on member 80. The joints 56, 62 and 76 of arm 44 are then unlocked whereby the robot 10 can place the work engaging member 80 at any predetermined position within the movement area of the powered and non-powered arms. In accordance with a specific example, robot 10 moves member 80 to a predetermined position in three dimensional space accurately located relative to device 88, where the non-powered can subsequently receive one of two parts or workpieces being attached. In FIG. 2, the robot's work engaging member 28 is shown positioning member 80 of the non-powered arm relative to device 88. The joints of the non-powered arm are now locked and the robot disengages its gripper fingers from blocks 86 and withdraws, leaving member 80 at the desired position.

In FIG. 3, the robot 10 is seen retrieving one of the parts 92 from conveyor 90. In accordance with a known mode of operation for the robot, programmed operation utilizes a video camera 30 mounted on member 28 as part of a "vision system" for scanning the part on the conveyor, selecting the desired part from other parts if need be, and engaging the part at precisely the correct location so that it can be placed properly by the robot. Robot member 28, carrying camera 30, will suitably approach part 92 from a location directly there above so that a correct field of vision is first provided to the camera. Alternatively, the part 92 can be positioned in a tray containing nests of parts whereby the position of any part is accurately known, enabling the robot to grasp the part at a predetermined point.

The robot then moves the part 92 to a location depicted in FIG. 4 where gripper fingers 82 of member 80 accurately grasp the part. Part 92 is positioned at exactly the correct location for subsequent attachment to a second part. Gripper fingers 32 of robot member 28 are then released and the robot is employed in substantially the same manner as illustrated in FIG. 3 for retrieving a second part 152 which is then positioned, as shown in FIG. 5, in precise juxtaposition with part 92. The device 88 is operated for drilling a hole through both parts 92 and 152 and inserting and securing a rivet through such hole. Generally speaking, this operation may be considered a tacking operation since it may be desired to insert other rivets between the two parts.

The robot member 28 is now operated to release fingers 32, and is moved to once more engage sockets 40, 42 and blocks 86 of member 80 in the manner herein before described. Joints 56, 62 and 76 are unlocked whereby member 80 can be removed to an initial location. After movement, the joints are relocked, the robot is utilized to grasp the assembly 92, 152, and the assembly is returned to device 88 for inserting more rivets. When construction is complete, the assembly may be placed upon a second conveyor (not shown).

As will be seen from the above sequence, assembly can be accomplished without any permanent fixture, but rather the "fixturing" is simply specified by the program operating robot 10. There is minimal tooling specific to the parts or workpieces, and preassembly of the parts is not required. The non-powered arm 44 operates as a three-dimensional clamp which can be located anywhere in reachable space for the purpose of holding one or both parts in an accurate position. The system is under the accurate control of the robot 10, having the capability of not only locating the parts, but also locating the arm 44 with a minimum of error.

While it is clear the function of locking and unlocking the joints 56, 62 and 776, as well as the function of opening and closing the gripper fingers 82 of the non-powered arm, could be accomplished under manual control, it is preferred these functions be carried out in response to the same program employed for sequencing the operation of robot 10.

Many variations are possible in relation to the sequence of events and positioning of the parts. For example, the robot may be employed first to engage the member 80 of the non-powered arm and then to position the non-powered arm relative to part 92 on conveyor 90 whereby the gripper fingers 82 of the non-powered arm can be employed to grasp the part 92. The robot then moves the non-powered arm complete with the part between the latter's gripping fingers to its location relative to device 88. The last mentioned procedure has fewer steps, but the first mentioned process has a smaller working envelope for the non-powered arm, i.e., arm 44 is not required to move to the position of conveyor 90.

Rather than moving the member 80 with the completed assembly grasped thereby to a second location, followed by retrieval of the assembly by the robot, the assembly can be left engaged between the head 96 and the anvil 98 of device 88 in closed position, after which the robot engages member 80 and moves it out of the way. Then, the robot can return for gripping the partially assembled parts for further riveting.

Computerized operation of the non-powered arm 44 is preferred, as herein before mentioned, with the powered robot being employed to manipulate the non-powered arm. However, the arm 44 can be manipulated manually to locate its gripper at any predetermined location, and then locked in place. Thus, it can be employed as a three-dimensional vise for use in welding or the like. A plurality of such arms can be moved and located either manually or robotically for generating fairly complex three-dimensional tooling. Referring to FIG. 12, a plurality of arms 44 are schematically illustrated as located at various positions to support a frame 154 comprised of parts which are being secured together with a robotic riveter 156. This type of three dimensional tooling can be altered robotically in an accurate manner to generate a practically infinite variety of different tools, the nature of which is recorded in the memory of the computer operated robot.

While preferred embodiments of the present invention have been shown and described, it will be apparent to those skilled in the art that many changes and modifications may be made without departing from the invention in its broader aspects. Thus, the non-powered arm 44 has been illustrated as suspended vertically from a standard or support 46. This gravity positioning of the arm 44 is quite convenient but clearly the arm can be supported and/or counterweighted in some different attitude. Furthermore, arm portion 60 of arm 44 is illustrated as comprising elements 60a and 60b disposed at right angles to one another. This configuration facilitates movement of the work engaging member 80 in the illustrated working envelope, i.e., so the joints which typically have a movement cone of approximately 60° can reach, and be moved within, the illustrated work area of the work cell. However, even though a 90° arm is preferred, clearly other configurations can be employed if desired.

In the illustrated embodiment, joints illustrated at 56, 62 and 76 are spheric in construction, but any other joint configuration can be used as may be appropriate in a particular application, e.g., prismatic, revolute, etc. Although conventional parallel grippers may be utilized as shown, various other kinds of grippers or clamps may be fitted to the robot arms. The construction of the non-powered arm is not restricted to three joints as in the illustrated embodiment, but rather the number of joints will depend on the work envelope. The appended claims are therefore intended to cover all changes and modifications as fall within the true spirit and scope of the invention.

I claim:

1. A robotic method for assembling two parts by means of a fastening tool, a powered robot arm, and a non-powered robot arm, said method comprising:

picking up and positioning a first said part for holding by said non-powered robot arm employing said powered robot arm including engaging said non-powered robot arm with said powered robot arm and positioning the non-powered robot arm in first predetermined work locating position for said first said part relative to said fastening tool, locking said non-powered robot arm in said position, disengaging said powered robot arm from said non-powered robot arm, picking up a second said part with said powered robot arm, positioning said powered robot arm carrying said second said part in a second predetermined work locating position for said second said part relative to said fastening tool, said first and second positions being adjacent one another, and performing a fastening operation on said first and second parts with said tool as said parts are simultaneously held in said first and second positions by said non-powered and powered arms.

2. The method according to claim 1 wherein said powered robot arm is employed for initially engaging the first said part and transferring the first said part to said non-powered arm.

3. The method according to claim 1 wherein the first said part is initially engaged with said non-powered arm by said powered arm before positioning thereof in said first predetermined work locating position by said powered arm.

4. The method according to claim 1 further including unlocking said non-powered arm and moving said non-powered arm carrying an assembly of said parts to a third position by means of said powered arm after said fastening operation.

5. The method according to claim 4 including robotically retrieving said assembly from said non-powered arm and returning said assembly to said fastening tool for further fastening operations.

* * * * *

UNITED STATES PATENT AND TRADEMARK OFFICE
CERTIFICATE OF CORRECTION

PATENT NO. : 4,894,901

DATED : January 23, 1990

INVENTOR(S) : Mark S. Soderberg

It is certified that error appears in the above-identified patent and that said Letters Patent is hereby corrected as shown below:

Column 6, line 49, "776" should be --76--.

Signed and Sealed this

Fourteenth Day of July, 1992

Attest:

DOUGLAS B. COMER

Attesting Officer   Acting Commissioner of Patents and Trademarks